United States Patent
Nishimura et al.

(10) Patent No.: US 6,709,378 B2
(45) Date of Patent: Mar. 23, 2004

(54) SUPERNATANT LIQUID COLLECTOR WITH BALANCE WEIGHT FORMING FUNCTION AND CENTRIFUGAL APPARATUS USING THE SAME

(75) Inventors: Shintaro Nishimura, Osaka (JP); Kazuyoshi Yajima, Osaka (JP); Satoshi Minoshima, Tokyo (JP); Ichiro Matsunari, Ishikawa (JP); Hiroshi Myogan, Ishikawa-Ken (JP)

(73) Assignees: Fujisawa Pharmaceutical Co., Ltd., Osaka (JP); Shibuya Kogyo Co., Ltd., Kanazawa (JP)

( * ) Notice: Subject to any disclaimer, the term of this patent is extended or adjusted under 35 U.S.C. 154(b) by 100 days.

(21) Appl. No.: 10/113,864

(22) Filed: Apr. 1, 2002

(65) Prior Publication Data

US 2002/0175114 A1 Nov. 28, 2002

(30) Foreign Application Priority Data

Apr. 5, 2001 (JP) ........................................ 2001/107294
Oct. 30, 2001 (JP) ........................................ 2001/333296

(51) Int. Cl.[7] ........................................... B01D 17/038
(52) U.S. Cl. ............................. 494/10; 494/17; 494/20; 494/32; 494/42; 422/101
(58) Field of Search ............................. 494/10, 17, 20, 494/32, 42, 82; 422/101; 210/97, 512.1

(56) References Cited

U.S. PATENT DOCUMENTS 4,058,252 A * 11/1977 Williams

FOREIGN PATENT DOCUMENTS

| JP | 50-11486 | 2/1975 |
| JP | 54-021670 | 2/1979 |
| JP | 3-293047 | 12/1991 |

* cited by examiner

Primary Examiner—Terry Cecil
(74) Attorney, Agent, or Firm—Flynn, Thiel, Boutell & Tanis, P.C.

(57) ABSTRACT

Primaiy supernatant liquid collector 1 allows blood A to separate into a primary supernatant liquid B and red blood cells by leaving the blood A stationary for a prescribed period of time, and then it discharges the primary supernatant liquid B and physiological saline W in the same amount into a first treatment container 13 and a first balance container 14, respectively. Centrifuge 61 centrifuges the above primary supernatant liquid B using the first balance container 14 as a balance weight, and a secondary supernatant liquid in the first treatment container 13 is transferred to a second treatment container 109 by take-out device 91 and at the same time the physiological saline W in the same amount as the transferred secondary supernatant liquid is transferred from the first balance container 14 to a second balance container 110.

9 Claims, 7 Drawing Sheets

SUPERNATANT LIQUID COLLECTOR WITH BALANCE WEIGHT FORMING FUNCTION AND CENTRIFUGAL APPARATUS USING THE SAME

FIELD OF THE INVENTION

The present invention relates to a supernatant liquid collector with a balance weight forming function and a centrifugal apparatus using the same, in particular, to a supernatant liquid collector with a balance weight forming function which is capable of forming a balance weight for centrifugation at the same time that it collects a primary supernatant liquid and a centrifugal apparatus using the same.

DESCRIPTION OF THE PRIOR ART

Figure 9:
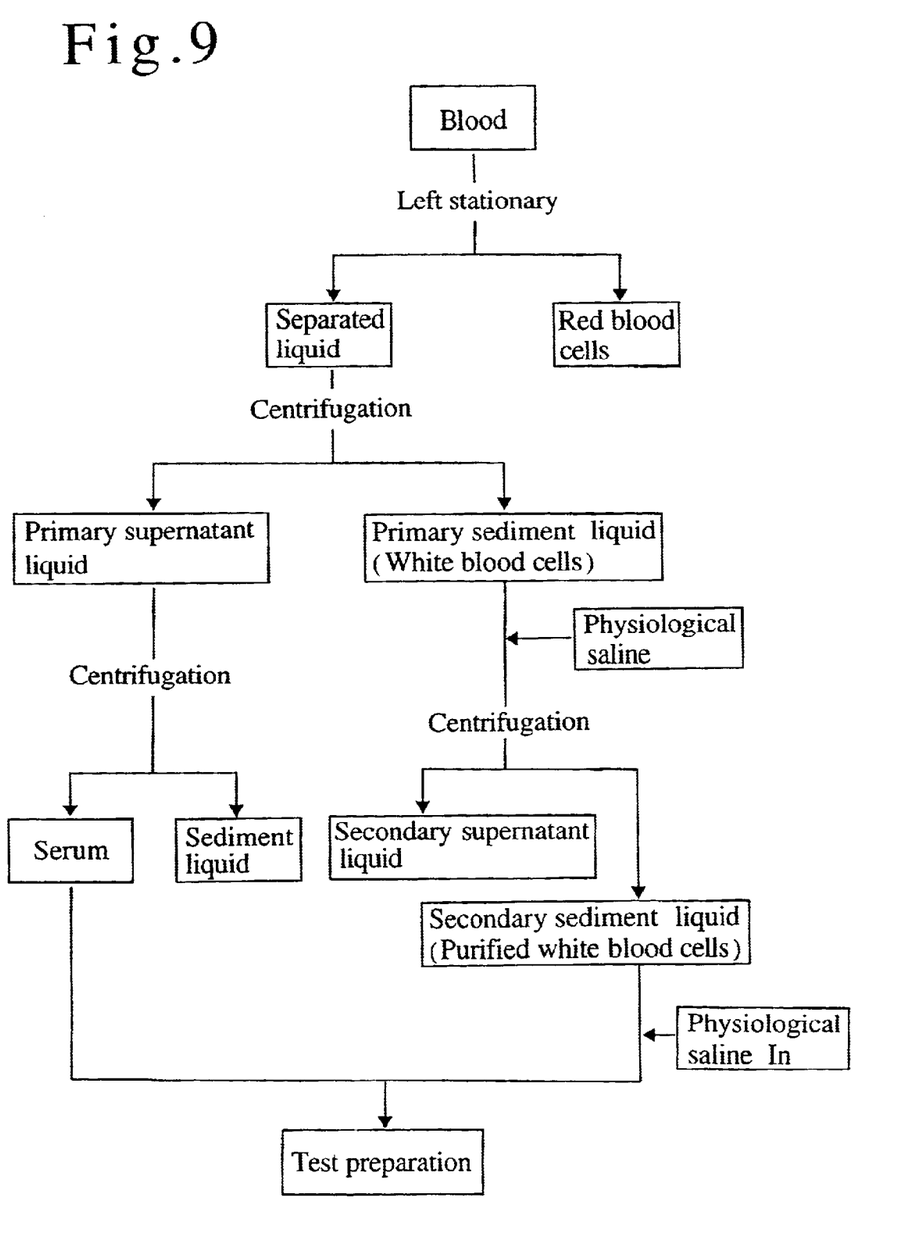
FIG. 9 is a flow chart showing a process of preparing a test preparation.

In the medical field, in order to obtain a test preparation by which white blood cells are labelled, blood collected from human bodies has been treated as described below. The treatment will be described with reference to the flow chart shown in FIG. 9.

First, the blood is left stationary for a prescribed period of time and allowed to separate into a primary supernatant liquid and red blood cells so as to settle the red blood cells. Then the primary supernatant liquid alone is taken out and centrifuged to a secondary supernatant liquid and a secondary sediment liquid, that is, a white blood cell liquid.

After that, physiological saline is added to the above white blood cell liquid, the solution is centrifuged to a tertiary supernatant liquid and a tertiary sediment liquid, that is, a purified white blood cell liquid, and the tertiary supernatant liquid is disposed of. On the other hand, the secondary supernatant liquid is centrifuged to a quaternary supernatant liquid, that is, serum and a quaternary sediment liquid.

Lastly, physiological saline, a radioactive isotope In (indium), and the above serum are added to the purified white blood cell liquid to obtain a test preparation by which white blood cells are labelled.

In such a treatment, when centrifuging the supernatant or sediment liquid of each step, a balance weight is required which is as heavy as the supernatant or sediment liquid, and conventionally such a balance weight has been formed manually using the same amount of water as the supernatant or sediment liquid.

The amount of primary supernatant liquid to be centrifuged, however, will vary from blood to blood collected from a human body, and the manual operation of pouring the same amount of water as the primary supernatant liquid into a container for the balance weight is troublesome. In addition, since a balance weight has been formed from visual estimation with a dropping pipet, an error has been likely to arise in measurement of the balance weight, which should have been as heavy as the primary supernatant.

Further, as described above, in order to obtain a test preparation by which white blood cells are labelled, a total of three configuration steps have been required starting from the primary supernatant, and since each step is troublesome and takes a considerable length of time, a person who is engaged in such operation may be infected with a disease due to his or her fault. In addition, acquiring a skill of such operation requires a considerable amount of effort.

Still further, since a radioactive isotope such as In is used in the above test preparation, it is feared that the operator may be exposed to radiation.

SUMMARY OF THE INVENTION

In the light of the problems described above, the object of this invention is to provide a supernatant liquid collector with a balance weight forming function which is capable of collecting a primary supernatant liquid and forming a balance weight to the exact weight of the primary supernatant liquid at the same time without requiring human hands, and in addition, to provide a centrifugal apparatus which uses the above supernatant liquid collector, and therefore, is capable of performing a number of times of centrifugation without requiring human hands.

Specifically, a supernatant liquid collector with a balance weight forming function of the first invention includes: a first syringe in which a liquid to be separated into a primary supernatant liquid and a primary sediment liquid by sedimentation is accumulated; a second syringe in which a liquid with a specific gravity equal to that of the above primary supernatant liquid is accumulated; a first treatment container which receives the primary supernatant liquid discharged from the above first syringe; a first balance container which receives the liquid discharged from the above second syringe; and a pushing member which pushes plungers of the above first and second syringes at the same time, the pushing member pushes the plunger of the first syringe and thereby discharges the primer supernatant liquid in the first syringe into the first treatment container while pushing the plunger of the second syringe and thereby discharges the liquid in the same amount as the primary supernatant liquid discharged into the first treatment container, from the second syringe into the first balance container.

A centrifugal apparatus of the sixth invention includes: a centrifuging means for centrifuging the primary supernatant liquid in the above first treatment container to a secondary supernatant liquid and a secondary sediment liquid using the first balance container as a balance weight; take-out means for taking out the secondary supernatant liquid from the first treatment container in which the primary supernatant liquid has been centrifuged to the secondary supernatant liquid and the secondary sediment liquid while taking out the liquid in the same amount as the above secondary supernatant liquid having been taken out from the first balance container; conveying means for conveying the treatment container and the balance container between the centrifuging means and the take-out means, the above centrifuging means being characterized in that it centrifuges the secondary sediment liquid remaining in the first treatment container using as a balance weight the first balance container from which the liquid has been taken out.

A centrifugal apparatus of the seventh invention includes: centrifuging means for centrifuging the primary supernatant liquid in the above first treatment container to a secondary supernatant liquid and a secondary sediment liquid using the above first balance container as a balance weight; take-out means for taking out the secondary supernatant liquid from the first treatment container in which the primary supernatant liquid has been centrifuged to the secondary supernatant liquid and the secondary sediment liquid and supplying the same to a second treatment container, while supplying the liquid in the same amount as the secondary supernatant liquid supplied to the second treatment container to a second balance container; conveying means for conveying the treatment container and the balance container between the centrifuging means and the take-out means, the centrifuging means being characterized in that it centrifuges the secondary supernatant liquid in the second treatment container using the second balance container as a balance weight.

A centrifugal apparatus of the eighth invention is the centrifugal apparatus of the sixth or seventh invention, characterized in that the take-out means takes out the secondary supernatant liquid from the first treatment container in which the primary supernatant liquid has been centrifuged to the secondary supernatant liquid and the secondary sediment liquid and supplying the same to the second treatment container, while allowing the secondary sediment liquid to remain in the first treatment container, and takes out from the first balance container the liquid in the same amount as the secondary supernatant liquid to be supplied to the second treatment container and supplies the same to the second balance container, while allowing the liquid in the same amount as the secondary sediment liquid remaining in the first treatment container to remain in the first balance container.

According to the supernatant liquid collector with a balance weight forming function of the first invention, a liquid to be separated into a primary supernatant liquid and a primary sediment liquid by sedimentation is accumulated in the first syringe and a liquid with a specific gravity equal to the above primary supernatant liquid is accumulated in the second syringe. After the liquid in the first syringe is separated into the primary supernatant liquid and the primary sediment liquid, the plungers of the first and second syringes are pushed with a pushing member at the same time.

Thus the primary supernatant liquid in the first syringe is discharged into the first treatment container and the same amount of liquid as the primary supernatant liquid discharged into the first treatment container from the second syringe is discharged into the first balance container at the same time.

Accordingly, the weight of the liquid in the first balance container becomes substantially the same as that of the primary supernatant liquid in the first treatment container; thus, a balance weight with the exact weight of the primary supernatant liquid can be formed at the same time that the primary supernatant liquid is collected by simple operation.

According to the centrifugal apparatus of the sixth invention, a primary supernatant liquid is prepared in the first treatment container and a liquid with a specific gravity equal to that of the primary supernatant liquid is prepared in the first balance container in the same amount as the primary supernatant with the above supernatant liquid collector and thereby the primary supernatant liquid in the first treatment container can be centrifuged to a secondary supernatant liquid and a secondary sediment liquid using the first balance container as a balance weight.

Then, with the take-out means, the secondary supernatant liquid alone can be taken out and discharged from the first treatment container while the liquid can be taken out and discharged from the first balance container in the same amount as the secondary supernatant liquid; as a result, the weight of the secondary sediment liquid remaining in the first treatment container becomes the same as that of the liquid remaining in the first balance container.

Therefore, after discharging the secondary supernatant liquid from the first treatment container, centrifugation can be carried out using the first balance container as a balance weight against the first treatment container.

According to the centrifugal apparatus of the seventh invention, a primary supernatant liquid is prepared in the first treatment container and a liquid with a specific gravity equal to that of the primary supernatant liquid is prepared in the first balance container in the same amount as the primary supernatant with the above supernatant liquid collector and thereby the primary supernatant liquid in the first treatment container can be centrifuged to a secondary supernatant liquid and a secondary sediment liquid using the first balance container as a balance weight.

Then, with the take-out means, the secondary supernatant liquid alone can be taken out from the first treatment container and supplied to the second treatment container while the liquid in the same amount as the secondary supernatant can be supplied to the second balance container; as a result, the weight of the secondary supernatant liquid supplied to the second treatment container becomes the same as that of the liquid supplied to the second balance container.

Therefore, centrifugation can be carried out using the second balance container as a balance weight against the second treatment container.

According to the centrifugal apparatus of the eighth invention, when taking out the secondary supernatant liquid with the above take-out means, the weight of the secondary sediment liquid remaining in the first treatment container can be the same as that of the liquid remaining in the first balance container while the weight of the secondary supernatant liquid supplied to the second treatment container can be the same as that of the liquid supplied to the second balance container.

Therefore, the first balance container and the second balance container can be prepared as balance weights against the first treatment container and the second treatment container, respectively, at the same time.

The above and other objects, features and advantages of the present invention will become apparent from the following detailed description when taken with the accompanying drawings.

DETAILED DESCRIPTION OF THE EMBODIMENTS

In the following the invention is described in terms of its embodiments with reference to the drawings. The invention provides a supernatant liquid collector with a balance weight forming function and a centrifugal apparatus using the same. And the embodiments of the invention are used for producing a test preparation by which white blood cells are labelled.

Figure 1:
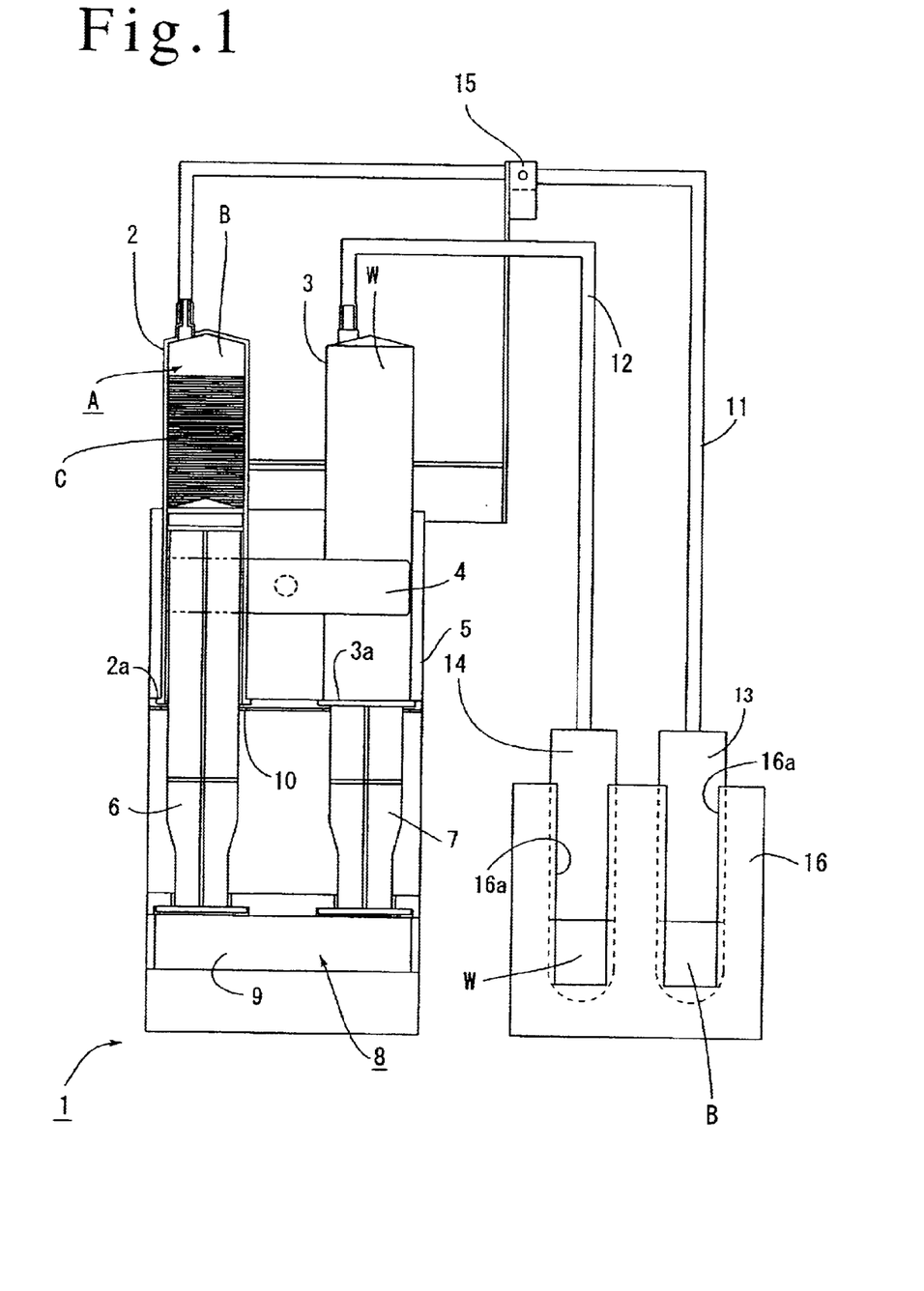
FIG. 1 is a front view of primary supernatant liquid collecting means 1 for use in a centrifugal apparatus in accordance with the invention.

Referring to FIGS. 1 to 4, there is shown a primary supernatant collecting means 1 as a supernatant collector which prepares a container for containing a liquid to be centrifuged. In FIG. 1, the primary supernatant collecting means 1 includes two syringes of the same type: a first syringe 2 and a second syringe 3, and the two syringes 2 and 3 are arranged parallel to each other with their openings facing up and fixed to an oscillating frame 5 with a clip 4.

The bottom portions of a plunger 6 of the first syringe 2 and a plunger 7 of the second syringe 3 are brought in contact with a pushing member 9, which constitutes a part of a syringe pump 8, so as to push both of the plungers 6, 7 at the same time and thereby discharging liquid from the syringes 2, 3 at the same time.

In the first syringe 2 a liquid to be separated by sedimentation, blood A, which is mixed with a red blood cell sedimentation accelerator (such as a red blood cell sedimentation agent HES 40, manufactured from Hishiyama Pharmaceutical Co., Ltd.) for accelerating the separation is accumulated. As the first syringe 2, the syringe having been used for blood collection is used as it is. As shown in FIG. 1, the blood A accumulated in the first syringe 2 is separated into a primary supernatant liquid B and a primary sediment liquid, red blood cells C, by sedimentation after it is left stationary for a prescribed period of time.

On the other hand, in the second syringe 3 accumulated is a liquid with a specific gravity equal to that of the first supernatant liquid B. In the embodiments, this liquid is physiological saline W.

The first syringe 2 and the second syringe 3 are fixed to the oscillating frame 5 with the clip 4 and flange portions 2a and 3a of the first and second syringes 2 and 3 are placed on a stand 10 located on the oscillating frame 5 with their heights made uniform; thus, their opening portions are of equal height. The heights of the plungers 6 and 7 are made uniform with the pushing member 9.

To the openings of the first and second syringes 2 and 3 attached are tubes 11 and 12, respectively, the tips of which are in communication with a first treatment container 13 and a first balance container 14, respectively, which are provided beside the oscillating frame 5. Both of the first treatment container 13 and the first balance container 14 are used in centrifuging means described later; therefore, they are such containers as can be placed in centrifuging means and moreover they are made equal to each other.

The first treatment container 13 and the first balance container 14 are placed on a stand 16 which allows the containers 13 and 14 to be uniform in height and the stand 16 is provided with notches 16a so that the liquid in the containers 13 and 14 can be visually observed.

In the middle of the tube 11 which allows the first syringe 2 and the first treatment container 13 to communicate with each other, detecting means 15 for detecting the interface between the first supernatant liquid B and red blood cells C is provided. The detail description of the detecting means 15 will be omitted since such a type of detecting means is well known.

In the above embodiment, the tubes 11 and 12 are used to allow the syringes 2,3 and the containers 13, 14 to communicate with each other; however, the embodiment has been shown for illustrative purpose only and not intended to limit the invention and any means can be used as long as they allow the syringes 2, 3 and the containers 13, 14 to communicate with each other.

Figure 2:
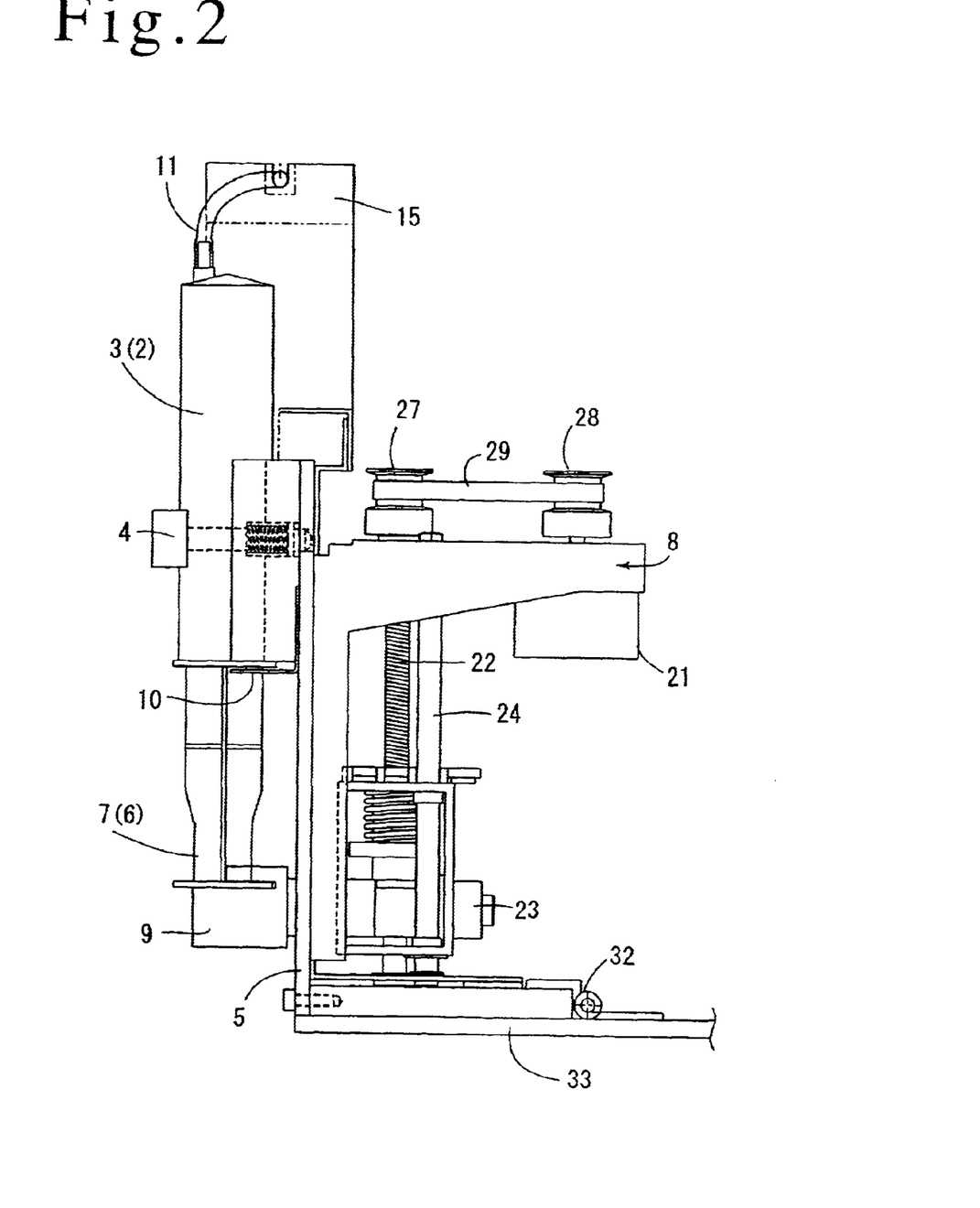
FIG. 2 is a side view of the primary supernatant liquid collecting means 1 of FIG. 1.

As shown in FIG. 2, the above syringe pump 8 includes: the above-described pushing member 9 for pushing the plungers 6 and 7; a feed screw 22 rotated with a motor 21; and a nut member 23 connected to the pushing member 9 and moving up and down as it meshes spirally with the feed screw 22.

The pushing member 9 is arranged on the front side of the oscillating frame 5 and the nut member 23 is arranged on the back side of the same, and both of them are connected to each other as a single unit in state where they go through a groove provided in the oscillating frame 5, but not shown in the figure. The nut member 23 is allowed to move up and down freely along guides 24 which are provided and fixed on both sides of the feeding screw 22, respectively, in parallel thereto and the feeding screw 22 meshes spirally the nut member 23 as it goes through the same.

The feeding screw 22 is axially supported with the oscillating frame 5 in a freely rotatable manner and on its top a pulley 27 is mounted. The motor 21 is mounted on the oscillating frame 5 and on its rotating shaft a pulley 28 is mounted. Between the two pulleys 27 and 28 a belt 29 is stretched, and the rotation of the motor 21 is transmitted to the feeding screw 22 via the pulley 28, the belt 29 and the pulley 27, whereby the nut member 23 and the pushing member 9 are allowed to move up and down.

Figure 3:
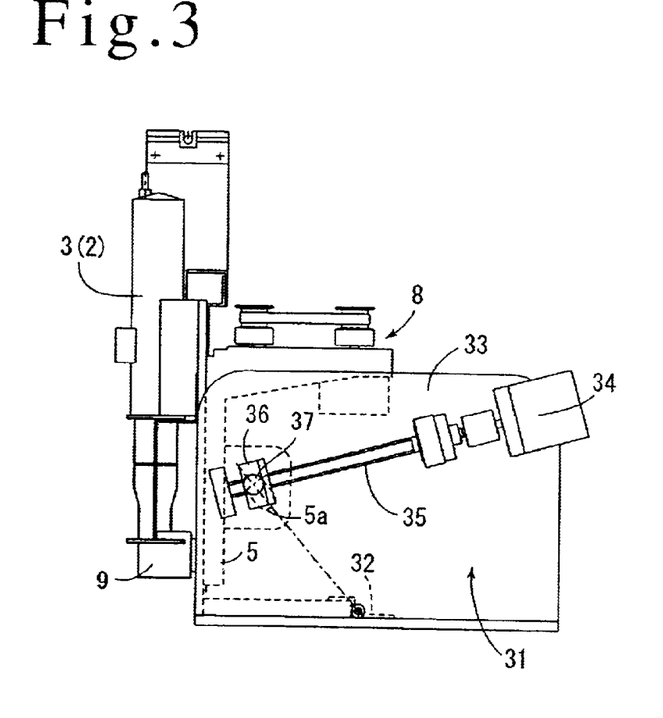
FIG. 3 is a side view related to a tilting instrument 31 for tilting the primary supernatant liquid collecting means 1 of the invention.
Figure 4:
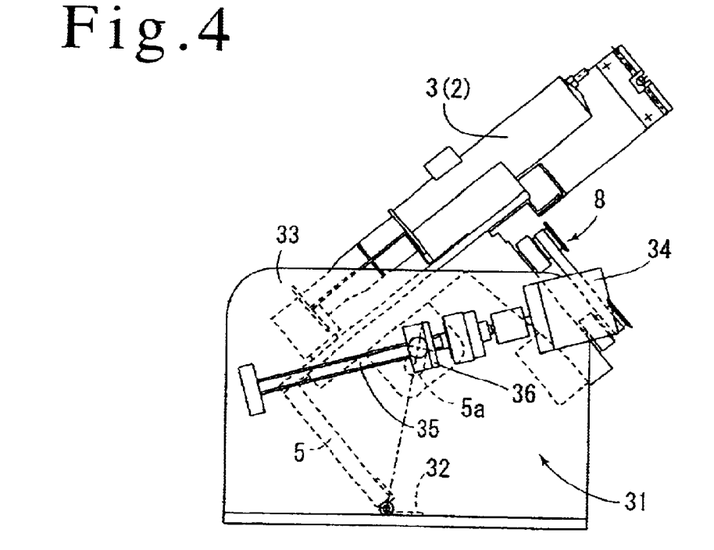
FIG. 4 is a side view related to the tilting instrument 31, showing the situation different from that of FIG. 3.

The oscillating frame 5 is mounted on a fixed frame 33 via a hinge 32 in a freely oscillating manner, and as shown in FIGS. 3 and 4, not only the oscillating frame 5 but the syringes 2 and 3 can be brought to either a perpendicularly rising state (the state shown in FIG. 3) or a tilted state (the state shown in FIG. 4) with a tilting instrument 31.

The tilting instrument 31 is provided so as to accelerate the sedimentation of the red blood cells C by tilting the blood A in the first syringe 2, for it is known that the closer the first syringe 2 is tilted to the horizontal, the more the sedimentation rate of the red blood cells C is increased. However, if the first syringe 2 is brought to a horizontally lying state, the settled red blood cells C may stick to the top wall of the first syringe 2 (the side when the syringe is in a horizontally lying state). Accordingly, at the time when raising the first syringe 2 perpendicularly again so as to extract the primary supernatant B, the primary supernatant B is likely to be mixed with the red blood cells C remaining sticking to the top wall of the first syringe 2. Thus, the first syringe 2 is so tilted that it will not be brought to a horizontally lying state and the settled red blood cells C will not stick to the top wall of the first syringe (roughly 30° to 50°) as shown in FIG. 4.

The tilting instrument 31 includes: a motor 34; a feeding screw 35 rotatively driven with the motor 34; and a nut member 36 allowed to move as it meshes spirally with the feed screw 35 as shown in FIG. 3.

The above feeding screw 35 is arranged on the side of the fixed frame 33 at an angle and axially supported in a rotatable manner, and the motor 34 is fixed on the side of the fixed frame 33 and connected to the feeding screw 35. The nut member 36 meshing spirally with the feeding screw 35 includes a connecting pin 37 which goes through a slotted hole, not shown in the figure, formed on the side of the fixed frame 33 along the feeding screw 35 and engages the inside of the slotted hole 5a provided on the side of the oscillating frame 5 in a slidable manner.

When the nut member 36 is moved back and forth along the feeding screw 35, the oscillating frame 5 is allowed to oscillate on the hinge 32, as a center, via the connecting pin 37 provided on the nut member 36 and the slotted hole 5a with which the connecting pin engages and is brought to either a perpendicularly rising state or a tilted state.

In the structure described above, the primary supernatant liquid collecting means 1 is used as follows.

First a needle is attached to the opening at the tip of the first syringe 2 to collect blood. After that, an anticoagulant, a red blood cell sedimentation accelerator and a little amount of air are sucked into the first syringe 2, followed by agitation. Then the needle is detached from the first syringe 2 and the tube 11 is attached instead, and the first syringe 2 is fixed with the clip 4 with its flange portion 2a of the first syringe 2 placed on the stand 10 of the oscillating frame 5 which is in a perpendicularly rising state.

On the other hand, physiological saline W equal or more than collected blood is sucked into the second syringe 3, then the tube 12 is attached to the opening at the tip of the second syringe 3, and the second syringe 3 is fixed with the clip 4 with its flange portion 3a of the second syringe 3 placed on the stand 10 of the oscillating frame 5.

After that, the pushing member 9 is moved upward by manually rotating the pulley 27 or 28 or manually rotating the motor 21, so that it is brought into contact with the plungers 6 and 7. Further, the plungers 6 and 7 are moved upward by moving the pushing member 9 upward slowly until the level of the blood A in the first syringe 2 is on the verge of exceeding the maximum height of the tube 11. During this operation, the level of the physiological saline W in the second syringe 3 so exceeds the maximum height of the tube 12 that it is discharged to the outside; however, since the first treatment container 13 and the first balance container 14 have not been set yet at this time, neither the blood A nor the physiological saline W is accumulated in the first treatment container 13 or the first balance container 14.

In this situation, the amount of the blood A in the first syringe 2 and the tube 11 becomes the same as that of the physiological saline W in the second syringe 3 and the tube 12 since the tubes 11 and 12 are arranged at identical conditions.

When the blood A and the physiological saline W in the primary supernatant liquid collecting means 1 reach such a state, the pushing member 9 is moved downward manually, so as to bring the blood A in the tube 11 back to the first syringe 2 and suck a prescribed amount of air into the same. Then the first treatment container 13 and the first balance container 14 are set at the tips of the tubes 11 and 12, respectively. At this time, the level of the blood A and that of the physiological saline W are the same.

After the syringes 2, 3 and the containers 13, 14 are set, the primary supernatant liquid collecting means 1 is operated by pushing the operation start button, not shown in the figure, thereof.

Then a controller, not shown in the figure, for controlling the primary supernatant collecting means 1 starts the motor 34 of the tilting instrument 31 to rotate the feeding screw 35, whereby the oscillating frame 5 is brought from a perpendicularly rising state to a tilted state. And when the oscillating frame 5 is tilted at a prescribed angle, the controller detects the fact with a limit switch, not shown in the figure, and stops the motor 34.

In such a situation, the primary supernatant collecting means 1 stands by for the separation of the blood A into a primer supernatant liquid B and red blood cells C for a prescribed period of time. It is known that the sedimentation time of the red blood cells C and the sedimentation time shortened by tilting the blood A can be calculated. When detecting the standby time having elapsed with its timer, the controlling instrument allows the motor 34 to start to rotate in the reverse direction.

Thus, the oscillating frame 5 is brought back to a perpendicularly rising state at such a speed as the primary supernatant liquid B in the first syringe 2 and the red blood cells C would not mix with each other, and when the first syringe 2 placed on the oscillating frame 5 is brought to a perpendicularly rising state, the controlling instrument detects the fact with a limit switch, not shown in the figure, and stops the motor 34.

Then the controlling instrument of the primary supernatant liquid collecting means 1 starts the motor 21 of the syringe pump 8 and thereby it moves the pushing means 9 upward slowly. When the plungers 6 and 7 are pushed upward by the upward movement of the pushing member 9, the primary supernatant liquid B is discharged from the first syringe 2 into the first treatment container 13 through the tube 11 and the physiological saline W is discharged from the second syringe 3 into the first balance container 14 through the tube 12.

When the interface between the primary supernatant liquid B and the red blood cells C passes through the detecting means 15 after the continuation of the upward movement of the pushing member 9, the detecting means 15 inputs the fact into the controlling instrument which in turn stops the motor 21 of the syringe pump 8. In such a situation, the primary supernatant liquid B alone is collected in the first treatment container 13 and the physiological saline W in the same amount as the primary supernatant liquid B is collected in the first balance container 14.

Accordingly, the level of the primary supernatant liquid B accumulated in the first treatment container 13 placed on the stand 16 is the same as that of the physiological saline W accumulated in the first balance container 14 placed on the same.

The primary supernatant liquid may be collected without the syringe pump 8 of this embodiment, just by manually moving the pushing member 9 up and down.

Figure 5:
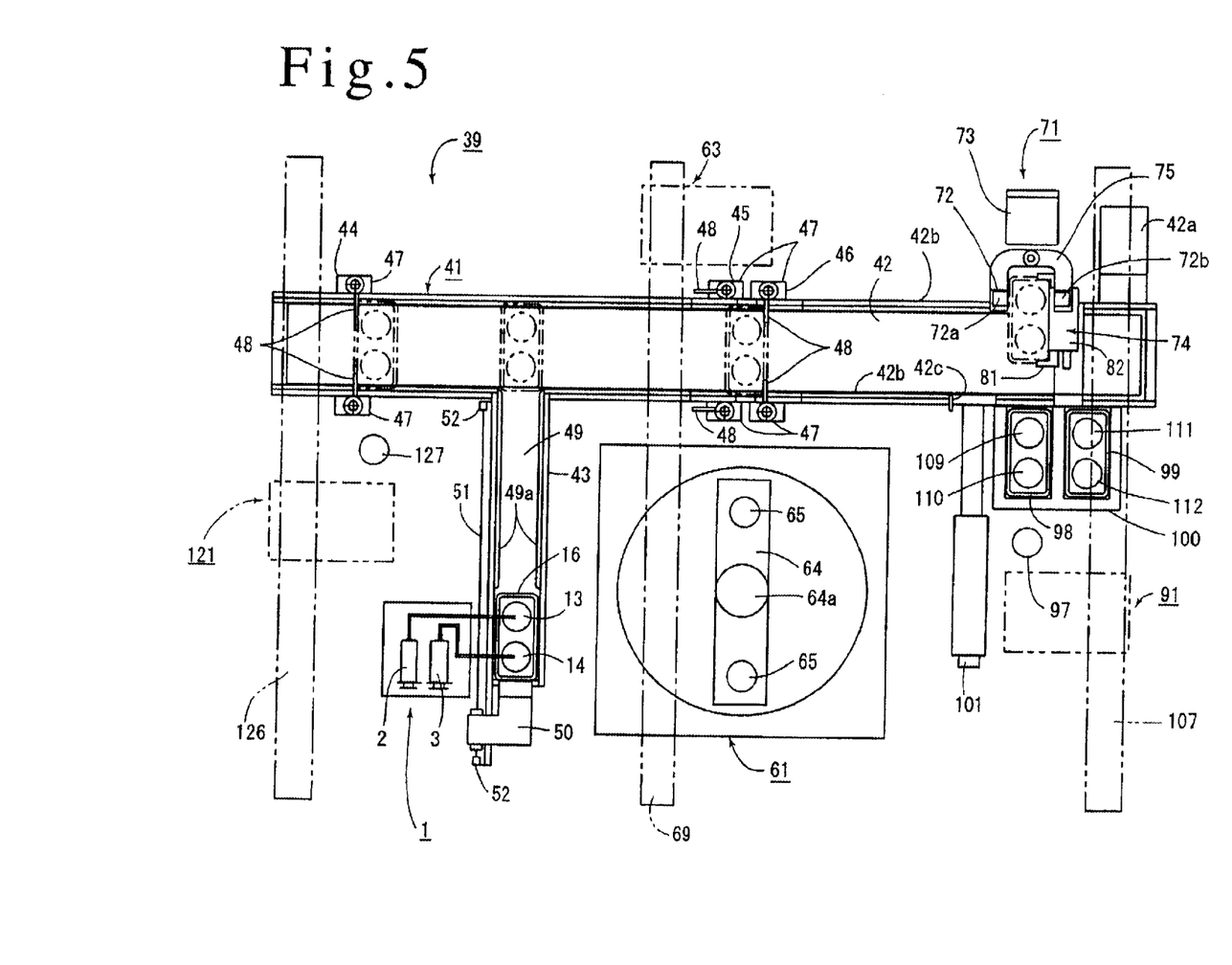
FIG. 5 is a plan view showing the entirety of a centrifugal apparatus 39 in accordance with the invention.
Figure 6:
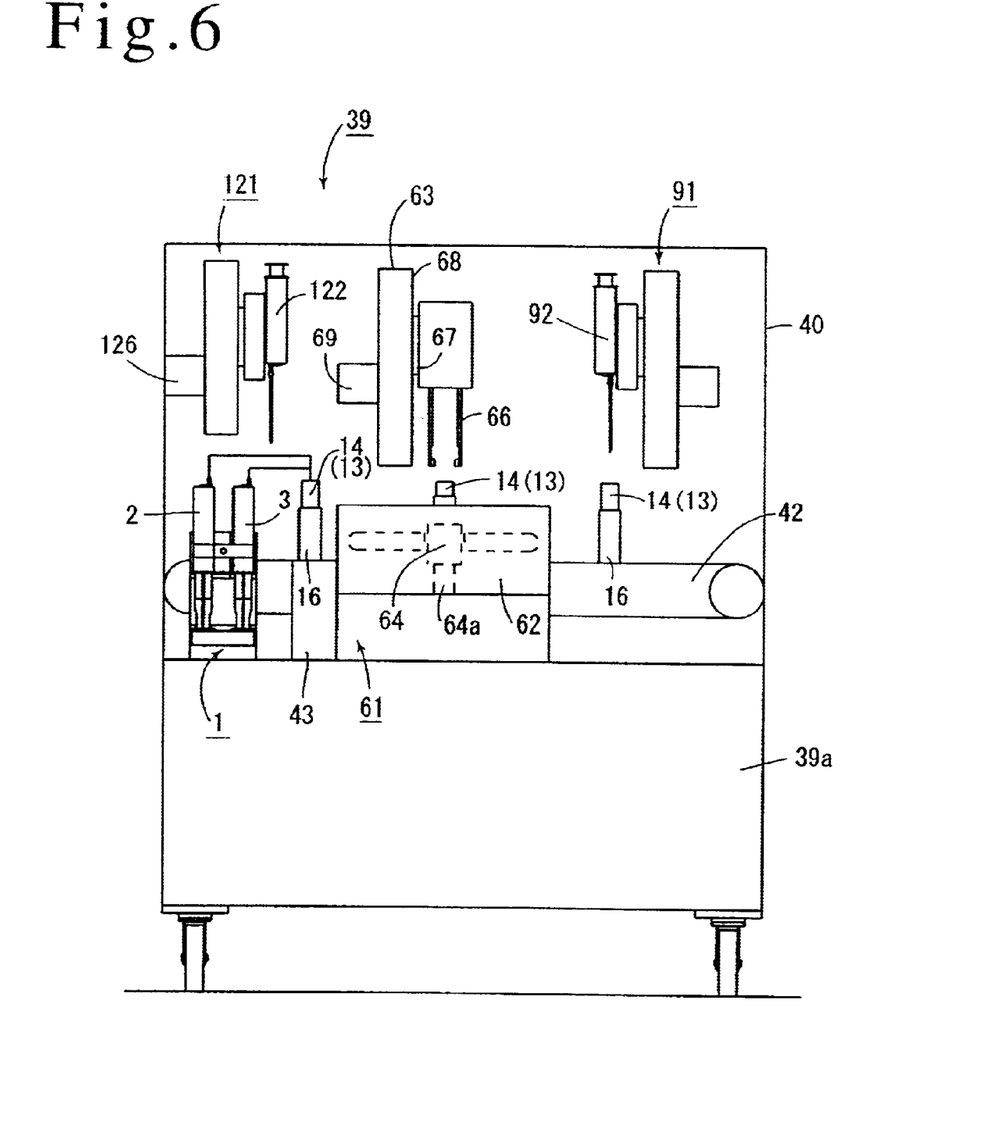
FIG. 6 is a front view of the centrifugal apparatus 39 of FIG. 5.

Then, the first treatment container 13, in which the primary supernatant liquid B collected with the primary supernatant collecting means 1 is accumulated, and the first balance container 14, in which the physiological saline W in the same amount as the primary supernatant liquid B is accumulated, are treated with a centrifugal apparatus 39, as shown in FIGS. 5 and 6.

The centrifugal apparatus 39 is installed in a constant-temperature chamber 40 shown in FIG. 6, of which temperature is kept constant. The centrifugal apparatus 39 includes a frame 39a which includes: the above described primary supernatant collecting means 1; centrifuging means 61 for centrifuging the primary supernatant liquid B of the first treatment container 13 to a secondary supernatant liquid and a secondary sediment liquid using the first balance container 14 as a balance weight; take-out means 91 for taking out from the first treatment container 13 the secondary supernatant liquid separated by the centrifugation while taking out from the first balance container 14 the physiological saline W in the same amount as the secondary supernatant liquid taken out.

The stand 16 on which the first treatment container 13 and the first balance container 14 are placed is conveyed between the first primary supernatant collecting means 1, the centrifuging means 61 and the take-out means 91 by conveying means 41.

The centrifugal apparatus 39 prepares a test preparation by which white blood cells are labelled from the primary supernatant liquid B in the following manner.

First, as described above, after the primary supernatant liquid B is accumulated in the first treatment container 13 and the physiological saline W in the same amount as the primary supernatant liquid B is accumulated in the first balance container 14 with the primary supernatant collecting means 1, the stand 16 on which the first treatment container 13 and the first balance container 14 are placed is conveyed to the centrifuging means 61 by the conveying means 41, and the first treatment container 13 and the first balance container 14 are taken from the stand 16 and set within the centrifuging means 61.

Then, as a primary separation step, the centrifuging means 61 centrifuges the primary supernatant liquid B in the first treatment container 13 to a secondary supernatant liquid and a secondary sediment liquid, white blood cells, using the first balance container 14 as a balance weight.

After that, the first treatment container 13 and the first balance container 14 are placed on the stand 16 again and conveyed to detecting means 71 by the conveying means 41. The detecting means 71 determines the amount of the secondary supernatant liquid by the height of the liquid surface of he secondary supernatant in the first treatment container 13 and that of the interface between the secondary supernatant and the white blood cells.

After the amount of the secondary supernatant liquid is determined in the above manner, the take-out means 91 takes out the secondary supernatant liquid alone from the first treatment container 13, while leaving the white blood cells (the secondary sediment liquid) in the same, and supplies the secondary supernatant liquid to a second treatment container 109 prepared in the vicinity.

The take-out means 91 takes out from the first balance container 14 the physiological saline W in the same amount as the secondary supernatant liquid and supplies the same to a second balance container 110 arranged adjacent to the second treatment container 109. In this situation, in the first balance container 14 the physiological saline W in the same amount as the white blood cell remaining in the first treatment container 13 remains.

Then, the take-out means 91 introduces the same amount of the physiological saline W into the first treatment container 13 and the first balance container 14, respectively, which are conveyed again to the centrifuging means 61 by the conveying means 41 and set in the inside thereof.

Then, as a secondary separation step, the centrifuging means 61 centrifuges the white blood cells in the first treatment container 13 to a tertiary supernatant liquid and a tertiary sediment liquid, purified white blood cells, using the first balance container 14 as a balance weight. At this time, since the physiological saline W in the same amount as the white blood cells in the first treatment container 13 is accumulated in the first balance container 14 by the above take-out process, the first balance container 14 can be used as a balance weight as it is.

Then the first treatment container 13 and the first balance container 14 are conveyed again to the detecting means 71, and after the detecting means 71 detects the amount of the tertiary supernatant liquid in the same manner as described above, the take-out means 91 takes out the tertiary supernatant liquid in the first treatment container 13 and discharges the same into a first waste container 111, so as to leave necessary purified white blood cells alone in the first treatment container 13. If necessary, the physiological saline W in the same amount as the tertiary supernatant liquid may be discharged from the first balance container 14 to a second waste container 112.

After the take-out means 91 adds required amount of the physiological saline W to the purified white blood cells remaining in the first treatment container 13, the conveying means 41 conveys the first treatment container 13 and the first balance container 14 to preparing means 121. The preparing means 121 adds an isotope, such as In, to the purified white blood cells in the first treatment container 13, and after the white blood cells with an isotope is left stationary for a prescribed period of time, the conveying means 41 releases the first treatment container 13 and the first balance container 14 from the centrifugal apparatus 39 and supplies the same to a post process not shown in the figure.

On the other hand, the second treatment container 109 and the second balance container 110 are accommodated by and placed on a stand 98 having the same structure as the stand 16, conveyed to the centrifuging means 61 by the conveying means 41, and set in the inside thereof.

Thus, as a tertiary separation step, the centrifuging means 61 centrifuges the primary supernatant liquid in the second treatment 109 to a quaternary supernatant liquid, this is serum, and a quaternary sediment liquid using the second balance container 110 as a balance weight.

The second treatment container 109 in which serum has been separated is released from the centrifugal apparatus 39 together with the second balance container 110, and the serum is added to the above In-added purified white blood cells in the first treatment container 13 in a post process not shown in the figure, to produce a test preparation by which white blood cells are labelled.

Then the detailed structure of the conveying means 41 will be described. As shown in FIG. 5, the conveying means 41 includes: a conveyer belt 42 for conveying the stand 16 in the right and left direction of the figure; and a first pushing instrument 43 conveying the stand 16 in the upward direction of the figure.

The conveyer belt 42 is capable of conveying the stand 16 with a motor 42*a* provided on the right and is provided with a stopper 44, which is installed on the left of the conveyer belt 42 and stops the stand 16 in the vicinity of the preparing means 121, and stoppers 45 and 46 which are installed in the middle of the conveyer belt 42 and stop the stand 16 in the vicinity of the centrifuging means 61. The detecting means 71 installed on the right of the conveyer belt 42 includes positioning means 74, described later, above the conveyer belt, and the stand 16 is stopped and positioned by the positioning means 74.

The stand 16 having completed its operation is carried out from the left end of the conveyer belt 42.

Each of the stoppers 44, 45 and 46 is so configured that a pair of bars 48 which are opened and closed by each motor 47 are placed on both sides of the conveyer belt 42. As to the stopper 44, it serves to stop the stand 16 conveyed from the right of the figure at position shown by the dot line in the vicinity of the preparing means 121, therefore, the pair of bars 48 are provided in such a manner as to come in contact with the left side of the stand 16.

On the other hand, as to the stoppers 45 and 46, they serve to stop the stand 16 conveyed from the left and right of the figure at position shown by the dot line in the vicinity of the centrifuging means 61; therefore, the pair of bars 48 are so provided that the stopper 45 comes in contact with the left side of the stand 16 conveyed from the right and the pair of bars as the stopper 46 are so provided that the bar 48 comes in contact with the right side of the stand 16 conveyed from the left.

One of the pair of bars 48 constituting each of the stoppers 44, 45 and 46 is provided with a limit switch not shown in the figure. When stopping the stand 16 on the conveyer belt 42, a control instrument not shown in the figure controls the motor 47 so as to direct the pair of bars 48 perpendicularly toward the inside of the conveyer belt 42, and when the stand 16 comes in contact with the bars and the limit switch is turned on, the control instrument stops the motor 42a of the conveyer belt 42 to stop the stand 16.

On the other hand, when allowing the stand 16 to pass, the controller controls the motor 47 so as to direct the pair of bars 48 toward the outside of the conveyer belt 42 and open the same and allow the stand 16 to pass.

The above described first pushing instrument 43 includes: a table 49 provided adjacent to the primary supernatant collecting means 1 and perpendicularly to the conveyer belt; and a pusher 50 for pushing the stand 16 placed on the table 49 in the upward direction of the FIG. 5. On the table 49, guides 49a are provided on both sides in such a manner that the both sides of the stand 16 fit into them, whereby the stand 16 can move along the guides 49a.

The first treatment container 13 is placed on the stand 16 placed on the table 49 on the upper side shown in FIG. 5, and as described above, the first treatment container 13 is in communication with the tube 11 which is connected to the first syringe 2 and the first balance container 14, which is placed below the first treatment container 13, is in communication with the tube 12 which is connected to the second syringe 3.

The pusher 50 is fixed to a belt 51 provided along the table 49 and allowed to move in the upward and downward directions of the figure by the rotation of a motor, not shown in the figure, provided for either one of pulleys 52 provided on the respective sides of the belt 51.

When the rotation of the motor moves the pusher 50 upward, the pusher 50 in turn pushes the stand 16 and thereby it can convey the stand 16 toward the conveyer belt 42.

When the pusher 50 is positioned at the lower or upper end of the table 49, a limit switch, not shown in the figure, provided on the table 49 is turned on, whereby the motor is stopped and the pusher 50 is also stopped.

The above described conveying means 41 also includes delivering means 63 for taking out the first treatment container 13 and the first balance container 14 from the stand 16 stopping on the conveyer belt 42 and conveying the same to the centrifuging means 61 and set therein.

The centrifuging means 61 is just the same as those in common use, and a rotor 64 of the centrifuging means 61 is provided with container placing portions 65, on which the first treatment container 13 and the first balance container 14 are placed respectively, at two positions symmetrical with respect to a rotational center 64a of the rotor.

In order to place the first treatment container 13 and the first balance container 14, which are on the stand 16, on the container placing portions 65, the rotor 64 is stopped with a control instrument in such a manner that the stand 16 and two container placing portions 65 are arranged in a straight line.

As shown in FIG. 6, the delivering means 63 includes: a gripper 66 for gripping the first treatment container 13 and the first balance container 14; and up-and-down means 67 for moving the gripper 66 up and down, and the up-and-down means 67 is moved horizontally by moving means 68.

The gripper 66 is opened and closed by an actuator not shown in the figure and thereby it grips the containers. For the moving means 68 a known linear guide is used, whereby the up-and-down means 67 and the gripper 66 are allowed to move along a guide rail 69 provided in the vertical direction of FIG. 5.

Figure 7:
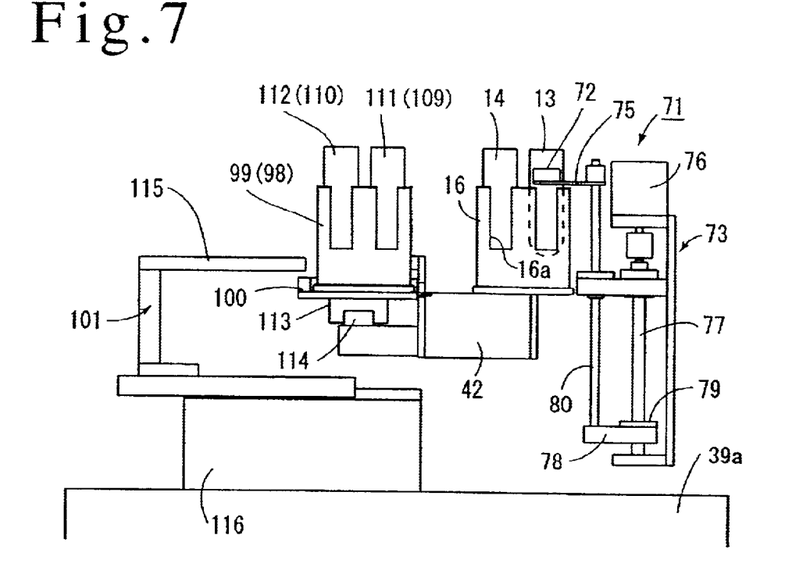
FIG. 7 is a side view related to detecting means 71 in accordance with the invention.

FIG. 7 shows the above described detecting means 71 which includes: a detecting element 72 for detecting the interface between a supernatant liquid and a sediment liquid; up-and-down means 73 for moving the detecting element 72 up and down; and positioning means 74 for positioning the stand 16 at the position detectable by the detecting element 72.

The detecting element 72 includes a light irradiating portion 72a and a light receiving portion 72b, which are fixed to a U-shaped stay 75 in such a manner as to allow a container to be arranged between them, as shown in FIG. 5.

The up-and down means 73 includes: a feeding screw 77 which is rotated by a motor 76; and a nut member 79 which moves a supporting member 78 up and down as it meshes spirally with the feeding screw 77, and on the supporting member 78 a supporting bar 80 is fixed which moves up and down along a guide and on the top of the supporting bar 80 the stay 75 of the detecting element 72 are fixed.

The positioning means 74 consists of: an accommodating portion 81 having a wall portion in the form of a rough rectangular with its left side missing which is made with the same size as the longitudinal part of the stand 16 of FIG. 5; and moving means 82 for moving the accommodating portion 81 in the vertical direction of the figure.

The accommodating portion 81 is formed in the form of a rough rectangular with its left side missing, and the upper and lower sides thereof are positioned at both edges of the conveyer belt 42. When the stand 16 conveyed by the conveyer belt 42 enters the space between the upper and lower sides and accommodated in the accommodating portion 81, a limit switch, not shown in the figure, is turned on and the conveyer belt 42 is stopped.

After that, the moving means 82 moves the accommodating portion 81 in the upward direction of FIG. 5, whereby the first treatment container 13 placed on the stand 16 is positioned between the light irradiating portion 72a and the light receiving portion 72b.

At this time, since the stand 16 is provided with a notch 16a, as shown in FIG. 7, even if the detecting element 72 moves up and down, the liquid in the first treatment container 13 can be detected by the detecting element 72.

Figure 8:
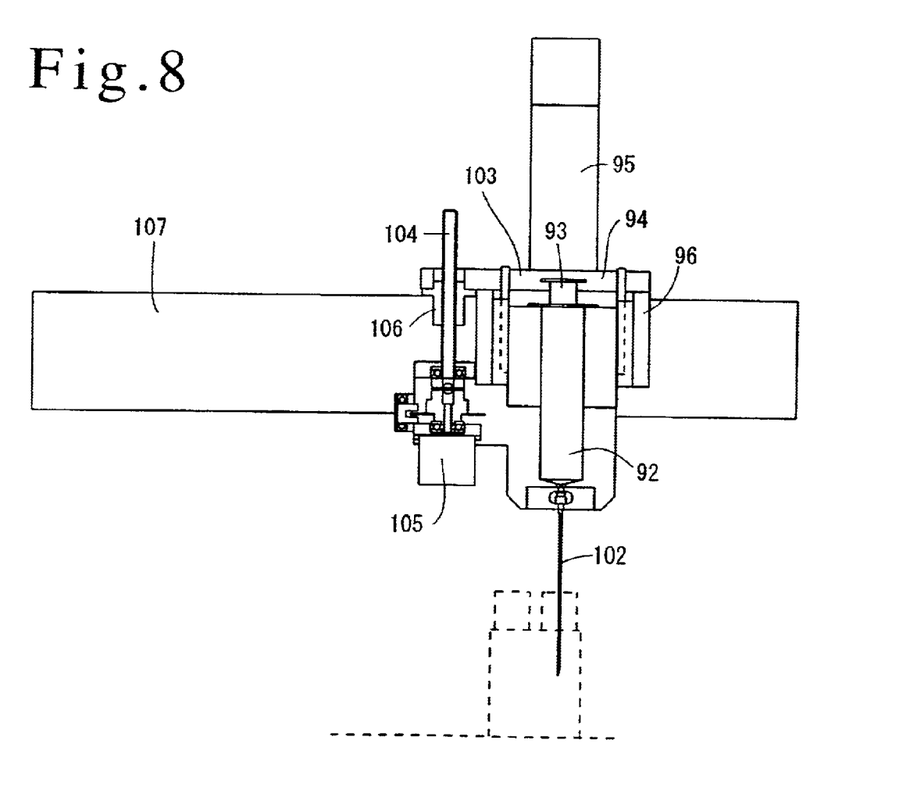
FIG. 8 is a side view related to take-out means 91 in accordance with the invention.

FIG. 8 shows the take-out means 91, which includes: a syringe 92 for taking out a liquid from a container; a syringe pump 94 for moving the plunger 93 of the syringe 92 up and down, up-and-down means 95 for moving the syringe 92 and the syringe pump 94 up and down as an integral unit; moving means 96 for moving the syringe 92 in the horizontal direction by moving the up-and-down means 95.

The syringe 92 is the same type as the syringe of the above primary supernatant collecting means 1, but the tip of the syringe 92 is provided with a needle 102. The syringe pump 94 includes: an up-and-down member 103 for moving the plunger 93 of the syringe 92 up and down along the guides provided on both sides of the syringe 92; a feeding screw 104 rotated by a motor 105; and a nut member 106 which is moved up and down as it meshes spirally with the feeding screw 104 and is connected to the up-and-down member 103. The above described up-and-down means 95 is moved by the moving means 96 along a guide rail 107 provided in the vertical direction of FIG. 5.

The take-out means 91 is provided with a slide table 100 moving left and right with two stands 98 and 99 placed thereon; and second pushing means 101 for pushing the stands 98 and 99 placed on the slide table 100 in the upward direction of the figure.

In FIG. 5, on the stand 98 placed on the left of the slide table 100 the second treatment container 109 and the second balance container 110 are placed as described above, and on the stand 99 placed on the right of the slide table 100 the first waste container 111 and the second waste container 112 are placed.

And, as shown in FIG. 7, on the bottom surface of the slide table 100 provided is a slide guide 113 via which the slide table 100 can be moved along a slide rail 114 in the left and right direction of FIG. 5.

When the slide table 100 is positioned at the right moving end of FIG. 5, the stand 98 is positioned in line with the stand 16 stopping in front of the detecting means 71. In this situation, the first treatment container 13 and the first balance container 14 on the stand 16 and the second treatment container 109 and the second balance container 110 on the stand 98 are in line with each other, and the needle 102 of the syringe 92 is allowed to move on the straight line. And, below the stand 98 of FIG. 5 provided is a physiological saline accumulating portion 97 for accumulating physiological saline which is also in the above straight line.

When the slide table 100 is moved from the above right moving end to the left, the stand 99 is positioned in line with the stand 16 stopping in front of the detecting means 71. In this situation, the first treatment container 13 and the first balance container 14 on the stand 16 and the first waste container 111 and the second waste container 112 on the stand 99 are in line with each other.

As shown in FIG. 7, the second pushing means 101 includes: a pusher 115 for pushing the stand 98 onto the conveyer belt 42; and an actuator 116 for moving the pusher 115 back and forth. Of guides 42b provided on both sides of the conveyer belt 42, one provided on the second pushing means 101 side is provided with an opening portion 42c through which the stand 98 is allowed to pass.

Accordingly, when the slide table 100 is positioned at the right end of FIG. 5, the stand 98 does not exist in the direction that the pusher 115 moves back and forth, and therefore, the second pushing means 101 keeps the pusher 115 in a standby state at a standby position.

On the other hand, when the slide table 100 is moved from the above right moving end to the left and the stand 99 is positioned below the stand 16, the pusher 115 pushes the stand 98 upward toward the conveyer belt 42 and the stand 99 passes through the above opening portion 42c and moves onto the conveyer belt 42.

When the slide table 100 is further moved to left and positioned at the left end, the pusher 115 pushes the stand 99 upward toward the conveyer belt 42 and the stand 99 passes through the opening portion 42c and moves onto the conveyer belt 42.

The above described preparing means 121 has the same structure as the take-out means 91, and as shown in FIG. 6, it includes a syringe 122, and in addition, a syringe pump, up-and down means and moving means which are not shown in the figure.

The preparing means 121 is capable of moving the syringe 122 along a guide rail 126 provided in the vertical direction of FIG. 5, and below the stopping position of the stand 16 in FIG. 5, an In accumulating portion 127 for accumulating In is provided.

According to the centrifugal apparatus 39 having the structure described so far, first the first treatment container 13 in which the primary supernatant liquid B is accumulated and the first balance container 14 in which the physiological saline in the same amount as the primary supernatant liquid B is accumulated are prepared on the stand 16 placed on the table 49 of the first pushing instrument 43 by the primary supernatant liquid collecting means 1.

Once the primary supernatant liquid B and the physiological saline W are prepared in the first treatment container 13 and the first balance container 14 on the stand 16, respectively, by the first supernatant collecting means 1, the motor of the first pushing instrument 43 is rotated, the pusher 50 is moved in the upward direction of FIG. 5 via the pulley 52 and the belt 51, and the stand 16 is moved onto the conveyer belt 42.

When pushing the stand 16 onto the conveyer belt 42, the limit switch, not shown in the figure, of the first pushing instrument 43 is turned on by the pusher 50, the motor is rotated in the reverse direction, and the pusher 50 is moved back to the former position. Once the pusher 50 reaches the standby position, the limit switch not shown in the figure is turned on, the motor is stopped, and the pusher 50 is stopped at the standby position.

Then the stand 16 placed on the conveyer belt 42 is conveyed to the right of FIG. 5 and, once reaching the centrifuging means 61, the stand 16 is stopped at a prescribed position by the stopper 46 on the right side, which has been closed with a control instrument in advance. At this point, the stand 16 comes in contact with the pair of bars 48 and thereby a limit switch, not shown in the figure, provided on the stopper 46 is turned on, followed by stopping the conveyer belt 42.

Once the stopper 46 stops the stand 16, the delivering means 63 of the centrifuging means 61 operates and the moving means 68 moves the gripper 66 above the first treatment container 13.

Then the up-and-down means 67 moves the gripper 66 downward, and once the gripper 66 grips the first treatment container 13, the up-and-down means 67 moves the gripper 66 upward again.

At this point, the stand 16 and the container placing portions 65 provided on the rotor 64 of the centrifuging means 61 are in line with each other; therefore, the moving means 68 moves the gripper 66 above either one of the container placing portions 65 provided on the rotor 64 of the centrifuging means 61.

Once the up-and-down means 67 moves downward and the gripper 66 sets the first treatment container 13 at one of the container placing portions 65, the first balance container 14 is also set at the other one of the container placing portions 65, where the first treatment container 13 is not been placed, in the same procedure.

Once the first treatment container 13 and the first balance container 14 are set at the respective container placing portions 65, the centrifuging means 61 starts to operate and the rotor 64 starts to rotate, whereby the first supernatant liquid B in the first treatment container 13 is separated into a secondary supernatant liquid and a secondary sediment liquid, white blood cells.

Then the rotor 64 is stopped in such a manner that the stand 16 and the container placing portions 65 are again in line with each other, and the delivering means 63 starts to operate again and places the first treatment container 13 and the first balance container 14 at the respective former portions of the stand 16, specifically it places the first treatment container 13 at the upper position of the stand 16 of FIG. 5 and places the first balance container 14 at the lower position of the same.

And once the control instrument opens the stopper 46, the conveyer belt 42 conveys the stand 16 to the right.

Once the stand 16 is conveyed on the conveyer belt 42 to the right and accommodated in the accommodating portion 81 of the positioning means 74, the conveyer belt 42 is stopped with the limit switch provided on the accommodating portion 81.

Then the moving means 82 starts to operate and moves the accommodating portion 81 in the upward direction of FIG. 5, whereby the first treatment container 13 placed on the stand 16 is positioned between the light irradiating portion 72a and light receiving portion 72b of the detecting element 72.

The detecting element 72 is positioned on the top end by the up-and-down means 73 and the position is a little higher than that of the first treatment container 13. Once the first treatment container 13 is stopped at a prescribed position by the positioning means 74, the controller operates the motor 76 of the up-and-down means 73 and the feeding screw 77 is rotated, whereby the detecting element 72 starts to move downward together with the supporting member 78.

When the detecting element 72 moves downward and the light irradiating portion 72a and light receiving portion 72b approach the liquid surface of the secondary supernatant liquid in the first treatment container 13 and the interface between the secondary supernatant liquid and the white blood cells, the light from the light irradiating portion 72a is blocked off and does not enter the light receiving portion 72b.

When the control instrument sensing the fact, it calculates the amount of the secondary supernatant liquid from the difference in height between the liquid surface of the secondary supernatant liquid and the interface between the secondary supernatant liquid and the white blood cells by which the light is blocked off.

Once the detecting means 71 determines the amount of the secondary supernatant liquid in the first treatment container 13, the take-out means 91 starts to operate, as a take-out process.

The moving means 96 moves the syringe 92 above the first treatment container 13 and the up-and-down means 95 moves the needle 102 down into the secondary supernatant liquid in the first treatment container 13. At this point, since the position of the interface between the secondary supernatant liquid and white blood cells has been already detected by the detecting means 71, the up-and-down means 95 moves the needle 102 down to the interface.

Once the needle 102 stops moving downward, the motor 105 of the syringe pump 94 starts to operate and the up-and-down member 103 together with the nut member 106 are moved upward by the rotation of the feeding screw 104, whereby the plunger 93 is moved upward. When the secondary supernatant liquid in the first treatment container 13 is sucked into the syringe 92 by the upward motion of the plunger 93 and thereby the liquid surface of the secondary supernatant liquid is lowered to the tip portion of the needle 102, the flow of the secondary supernatant liquid into the syringe 92 is stopped. In this situation, in the first treatment container 13 white blood cells alone remains.

Once the secondary supernatant liquid is accumulated in the syringe 92, the up-and-down means 95 moves the needle 102 upward and positions the same above the first treatment container 13, and then the moving means 96 moves the syringe 92 in the downward direction of FIG. 5.

At this point, the slide table 100 is positioned at the right end and the stand 98 is positioned below the stand 16. And once the moving means 96 moves the syringe 92 above the second treatment container 109 placed on the stand 98, the up-and-down means 95 moves the needle 102 downward and thereby the needle 102 is inserted into the second treatment container 109.

Then the syringe pump 94 starts to operate and thereby the secondary supernatant liquid in the syringe 92 is injected into the second treatment container 109, and when the secondary supernatant liquid in the syringe 92 is completely discharged, the needle 102 is moved upward and then the moving means 96 conveys the needle 102 above the first balance container 14. In this situation, the up-and-down means 95 moves the needle 102 down to the same height as in the case of the first treatment container 13.

Thus, the physiological saline W in the same amount as the secondary supernatant liquid taken from the first treatment container 13 is sucked from the first balance container 14, and then the syringe 92 is conveyed to the second balance container 110 by the up-and-down means 95 and the moving means 96. And once the needle 102 is inserted into the second balance container 110, the syringe pump 94 starts to operate and thereby the physiological saline W is injected into the second balance container 110.

As a result, the secondary supernatant liquid and the physiological saline W in the same amount are accumulated in the second treatment container 109 and the second balance container 110, respectively.

After that, the syringe 92 having been used for injecting the physiological saline W into the second balance container 110 is moved above the physiological saline accumulating portion 97 by the moving means 96 and sucks a prescribed amount of the physiological saline in the syringe 92. Then, the physiological saline is in turn injected into the first treatment container 13.

The physiological saline in the same amount as that injected into the first treatment container 13 is then injected into the balance container 14 by the take-out means 91.

Then the stand 16 positioned within the detecting means 71 is moved back onto the conveyer belt 42 by moving the accommodating portion 81 to the bottom end shown in FIG. 5, and in this situation the stand 16 is moved to left by the conveyer belt 42.

At this time, the control instrument closes the stopper 45 on the left side, of the two stoppers 45 and 46 installed in the centrifuging means 61, accordingly the stand 16 is stopped with the stopper 45 and the conveyer belt 42 is also stopped.

Once the stand 16 is stopped, the first treatment container 13 and the first balance container 14 are conveyed by the delivering means 63 and placed on the respective container placing portions 65 of the rotor 64.

And the centrifuging means 61 starts to operate and the rotor 64 is rotated, whereby the white blood cells in the first treatment container 13 is separated into a tertiary supernatant liquid and a tertiary sediment liquid, that is, purified white blood cells.

When the secondary separation process by the centrifuging means 61 is completed, the delivering means 63 moves the first treatment container 13 and the first balance container 14 back onto the stand 16 on the conveyer belt 42, and then the conveyer belt 42 conveys the stand 16 again to the detecting means 71.

At the detecting means 71, the liquid surface of the tertiary supernatant liquid in the first treatment container 13 and the interface between the tertiary supernatant liquid and the purified white blood cells are detected in the same procedure as described above. And at the same time, the slide table 100 is moved to the left and allows the stand 99 to be positioned below the stand 16.

The take-out means 91 takes out the tertiary supernatant liquid from the first treatment container 13 while allowing the tertiary sediment liquid, the purified white blood cells, to remain in the first treatment container 13. The tertiary supernatant liquid having been taken out by the take-out means 91 is an unnecessary liquid; therefore, the take-out means 91 disposes of the liquid in the first waste container 111. At this time, the physiological saline W in the first balance container 14 in the same amount as the tertiary supernatant liquid may be discharged into the second waste container 112, as described above.

After that, once a prescribed amount of the physiological saline is injected from the physiological saline accumulating portion 97 into the first treatment container 13 by the take-out means 91, the conveying means 41 conveys the first treatment container 13 and the first balance container 14 to the preparing means 121.

When the conveying means 41 conveys the stand 16 to the preparing means 121, both of the stoppers 45 and 46 installed in the centrifuging means 61 are opened with the controlling instrument; therefore, the stand 16 is conveyed to the preparing means 121 through the centrifuging means 61.

At the preparing means 121, since the stopper 44 is closed with the controller, the stand 16 is stopped with the stopper 44 and the conveyer belt 42 is also stopped.

The preparing means 121, like the take-out means 91, moves the syringe 122 with the up-and-down means and the moving means, and takes out In from the In accumulating portion 127 and introduces the same into the first treatment container 13.

Thus In is introduced into the first treatment container 13. After the container is left stationary for a prescribed period of time, the stopper 44 is opened with the control instrument and the conveyer belt 42 starts to operate, whereby the stand 16 is conveyed to the left and released from the centrifugal apparatus 39.

As described above, the secondary supernatant liquid and the physiological saline W in the same amount are accumulated in the second treatment container 109 and the second balance container 110, respectively.

The stand 98 on which the second treatment container 109 and the second balance container 110 are placed is placed on the slide table 100 which has been moved to the left, and the stand 98 is pushed by the pusher 115 of the second pushing means 101 and conveyed onto the conveyer belt 42 through the opening portion 42c. Then the stand 98 is conveyed to the left by the conveyer belt 42 and stopped with the stopper 45 installed in the centrifuging means 61.

The second treatment container 109 and the second balance container 110 are placed on the container placing portion 65 of the rotor 64 by the delivering means 63, and the secondary supernatant liquid in the second treatment container 109 is separated into a quaternary supernatant liquid, that is, serum and a quaternary sediment liquid by the centrifuging means 61.

After that, the stand 98 accommodating the second treatment container 109 is released from the centrifugal apparatus 39 with the conveyer belt 42, and the serum in the second treatment container 109 is added to the purified white blood cells in the first treatment container 13 into which In has been already introduced, to produce a test preparation by which white blood cells are labelled, as described above. The stand 99 accommodating the first waste container 111 is pushed onto the conveyer belt 42 with the pusher 115 of the second pushing means 101 from the slide table moved the left end and released from the centrifugal apparatus 39 with the conveyer belt 42.

While the present invention has been described in connection with certain preferred embodiments, it is to be understood that the subject matter encompassed by the present invention to include all alternatives, modifications, and equivalents as can be included within the spirit and scope of the following claims.

What is claimed is:

1. A supernatant liquid collector with a balance weight forming function comprising: a first syringe in which a liquid to be separated into a primary supernatant liquid and a primary sediment liquid by sedimentation is accumulated; a second syringe in which a liquid with a specific gravity equal to that of the primary supernatant liquid is accumulated; a first treatment container which receives the primary supernatant liquid discharged from the first syringe; a first balance container which receives the liquid discharged from the second syringe; and a pushing member which pushes plungers of the first and second syringes at the same time, the pushing member pushes the plunger of the first syringe and thereby discharges the primer supernatant liquid in the first syringe into the first treatment container while pushing the plunger of the second syringe and thereby discharges the liquid in the same amount as the primary supernatant liquid discharged into the first treatment container from the second syringe into the first balance container.

2. The supernatant liquid collector with a balance weight forming function according to claim 1, wherein the pushing member is moved forward with a syringe pump, and the syringe pump, once its operation is started, stands by for the separation of the liquid accumulated in the first syringe into a primary supernatant and a primary sediment liquid by sedimentation and then operates the pushing member to push the plungers of the first and second syringes at the same time.

3. The supernatant liquid collector with a balance weight forming function according to claim 2, wherein detecting means for detecting the primary supernatant liquid discharged from the first syringe changing into a primary sediment liquid is provided in the middle of a communicating path which allows the first syringe and the first treatment container to be in communication with each other and, once the detecting means detects the primary supernatant liquid having changed into the primary sediment liquid, the operation of the syringe pump is stopped.

4. The supernatant liquid collector with a balance weight forming function according to claim 2, further comprising a tilting instrument for bringing the first syringe to a perpendicularly rising state or a tilting state, the tilting instrument accelerating the separation of the primary supernatant liquid and the primary sediment liquid by keeping the first syringe in a tilting state and the syringe pump operating the pushing member once the first syringe is brought from a tilting state to a perpendicularly rising state.

5. The supernatant liquid collector with a balance weight forming function according to claim 1, wherein the liquid separated into the primary supernatant liquid and the primary sediment liquid by the sedimentation is blood.

6. A centrifugal apparatus using the supernatant liquid collector with a balance weight forming function according to claim 1, the centrifugal apparatus comprising:

centrifuging means for centrifuging the primary supernatant liquid in the first treatment container to a secondary supernatant liquid and a secondary sediment liquid using the first balance container as a balance weight; take-out means for taking out the secondary supernatant liquid from the first treatment container in which the primary supernatant liquid has been centrifuged to the secondary supernatant liquid and the secondary sediment liquid, while taking out from the first balance container the liquid in the same amount as the secondary supernatant liquid having been taken out from the first treatment container; and conveying means for conveying the treatment container and the balance container between the centrifuging means and the take-out means, the centrifuging means centrifuges the secondary sediment liquid remaining in the first treatment container using as a balance weight the first balance container from which the liquid has been taken out.

7. A centrifugal apparatus using the supernatant liquid collector with a balance weight forming function according to claim 1, the centrifugal apparatus comprising:

centrifuging means for centrifuging the primary supernatant liquid in the first treatment container to a secondary supernatant liquid and a secondary sediment liquid using the first balance container as a balance weight; take-out means for taking out the secondary supernatant liquid from the first treatment container and supplying the same to a second treatment container, while supplying the liquid in the same amount as the secondary supernatant liquid supplied to the second treatment container to a second balance container; conveying means for conveying the treatment container and the balance container between the centrifuging means and the take-out means, the centrifuging means centrifuges the secondary supernatant liquid in the second treatment container using the second balance container as a balance weight.

8. The centrifugal apparatus according to claim 7, wherein the take-out means takes out the secondary supernatant liquid from the first treatment container in which the primary supernatant liquid has been centrifuged to the secondary supernatant liquid and the secondary sediment liquid and supplies the same to the second treatment container, while allowing the secondary sediment liquid to remain in the first treatment container, and takes out from the first balance container the liquid in the same amount as the secondary supernatant liquid to be supplied to the second treatment container and supplies the same to the second balance container, while allowing the liquid in the same amount as the secondary sediment liquid remaining in the first treatment container to remain in the first balance container.

9. The centrifugal apparatus according to claim 8, wherein the centrifuging means centrifuges the secondary sediment liquid remaining in the first treatment container using as a balance weight the first balance container from which the liquid has been taken out, while centrifuging the secondary supernatant liquid in the second treatment container using the second balance container as a balance weight.

* * * * *